United States Patent
Hickmann et al.

(10) Patent No.: US 11,520,562 B2
(45) Date of Patent: Dec. 6, 2022

(54) SYSTEM TO PERFORM UNARY FUNCTIONS USING RANGE-SPECIFIC COEFFICIENT SETS

(71) Applicant: Intel Corporation, Santa Clara, CA (US)

(72) Inventors: Brian J. Hickmann, Sherwood, OR (US); Nitin N. Garegrat, San Jose, CA (US); Maciej Urbanski, Gdansk (PL); Michael Rotzin, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 16/557,959

(22) Filed: Aug. 30, 2019

(65) Prior Publication Data

US 2019/0384575 A1 Dec. 19, 2019

(51) Int. Cl.
*G06F 7/552* (2006.01)
*G06F 1/03* (2006.01)
*G06F 17/17* (2006.01)

(52) U.S. Cl.
CPC ............... *G06F 7/552* (2013.01); *G06F 1/03* (2013.01); *G06F 17/17* (2013.01)

(58) Field of Classification Search
CPC .......................... G06F 17/17; G06F 1/03–0356
See application file for complete search history.

(56) References Cited

U.S. PATENT DOCUMENTS

| | | | |
|---|---|---|---|
| 5,331,582 A | 7/1994 | Sudo et al. | |
| 10,169,296 B2 | 1/2019 | Korthikanti et al. | |
| 10,228,937 B2 | 3/2019 | Werner et al. | |
| 10,482,155 B2 | 11/2019 | Werner et al. | |
| 2004/0044710 A1* | 3/2004 | Harrison | G06F 7/544 708/200 |
| 2013/0124586 A1 | 5/2013 | Fenney | |
| 2013/0339564 A1* | 12/2013 | Nogueira | G06F 1/03 710/305 |
| 2015/0019604 A1* | 1/2015 | Diewald | G06F 17/17 708/208 |
| 2018/0081634 A1* | 3/2018 | Mahurin | G06F 7/544 |
| 2018/0188972 A1 | 7/2018 | Yang et al. | |

(Continued)

FOREIGN PATENT DOCUMENTS

EP 3563304 A1 11/2019
WO 2018126073 A1 7/2018

OTHER PUBLICATIONS

EPO; Extended European Search Report issued in EP Patent Application No. 20181387.0, dated Nov. 20, 2020; 7 pages.

(Continued)

*Primary Examiner* — Matthew D Sandifer
(74) *Attorney, Agent, or Firm* — Alliance IP, LLC

(57) ABSTRACT

A method comprising storing a plurality of entries, each entry of the plurality of entries associated with a portion of a range of input values, each entry of the plurality of entries comprising a set of coefficients defining a power series approximation; selecting first entry of the plurality of entries based on a determination that a floating point input value is within a portion of the range of input values that is associated with the first entry; and calculating an output value by evaluating the power series approximation defined by the set of coefficients of the first entry at the floating point input value.

19 Claims, 15 Drawing Sheets

(56) References Cited

U.S. PATENT DOCUMENTS

| | | |
|---|---|---|
| 2018/0189227 A1 | 7/2018 | Korthikanti et al. |
| 2018/0189238 A1 | 7/2018 | Lau et al. |
| 2018/0189652 A1 | 7/2018 | Korthikanti et al. |
| 2019/0310827 A1* | 10/2019 | Gagliano ................ G06F 17/14 |
| 2019/0392297 A1 | 12/2019 | Lau et al. |
| 2020/0201601 A1* | 6/2020 | Mangnall ................ G06F 7/544 |

OTHER PUBLICATIONS

Yang, Andrew, et al., "Deep Learning Hardware", U.S. Appl. No. 62/440,980, filed Dec. 30, 2016, 530 pages.

* cited by examiner

600

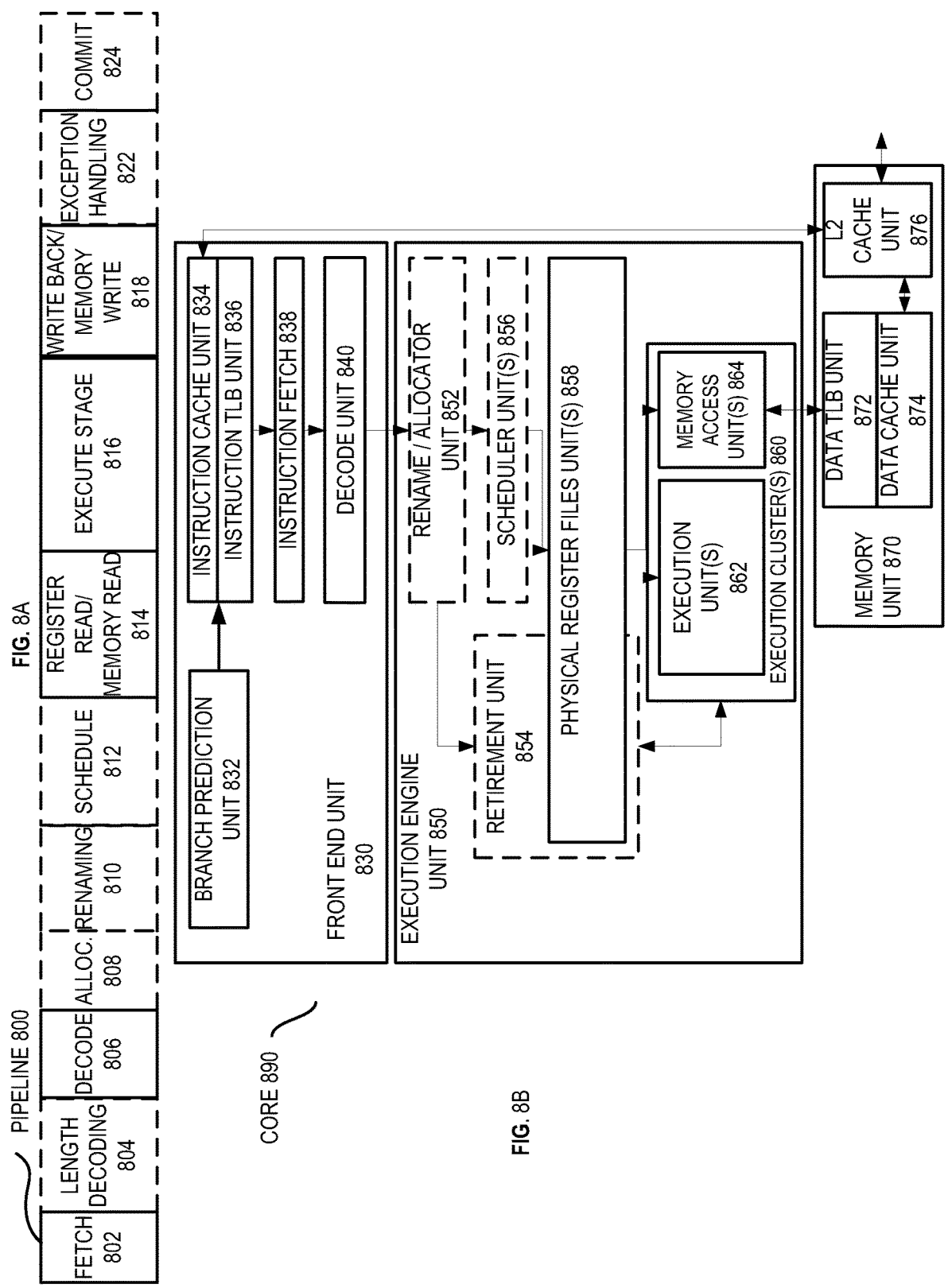

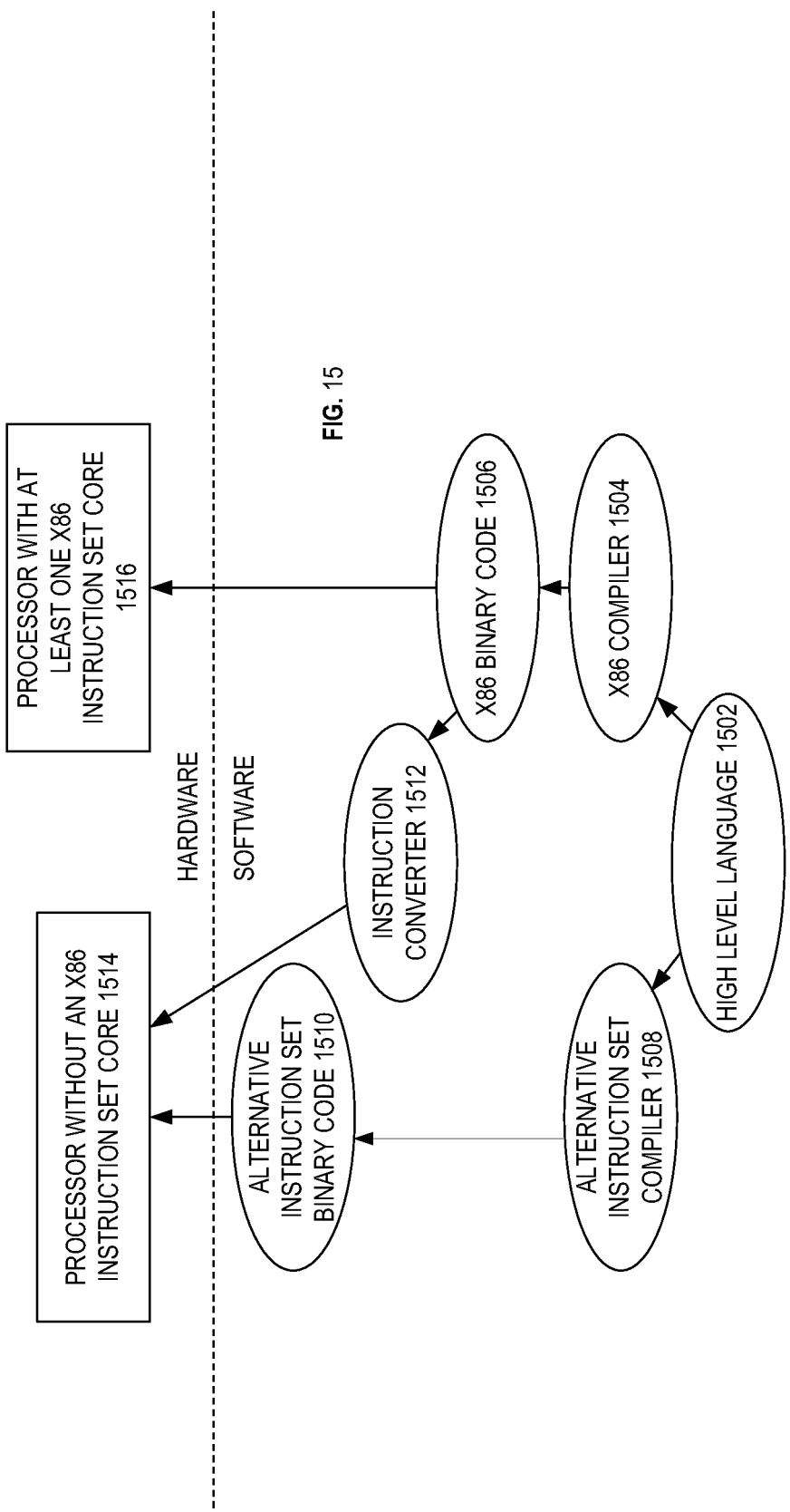

SYSTEM TO PERFORM UNARY FUNCTIONS USING RANGE-SPECIFIC COEFFICIENT SETS

The present disclosure relates in general to the field of computer development, and more specifically, to data processing.

BACKGROUND

A processor may perform a unary function that takes one argument as an input and generates an output. Examples of unary functions include transcendental functions (e.g., tanh, log 2, exp 2, sigmoid), irrational functions (e.g., sqrt, 1/sqrt), and common rational functions useful for machine learning and neural networks (e.g., 1/x). Some unary functions of an input value (x) are not easily performed using basic mathematic operations such as addition, subtraction, and multiplication.

BRIEF DESCRIPTION OF THE DRAWINGS

FIG. 8A is a block diagram illustrating both an exemplary in-order pipeline and an exemplary register renaming, out-of-order issue/execution pipeline in accordance with certain embodiments.

FIG. 8B is a block diagram illustrating both an exemplary embodiment of an in-order architecture core and an exemplary register renaming, out-of-order issue/execution architecture core to be included in a processor in accordance with certain embodiments;

FIG. 15 is a block diagram contrasting the use of a software instruction converter to convert binary instructions in a source instruction set to binary instructions in a target instruction set in accordance with certain embodiments.

Like reference numbers and designations in the various drawings indicate like elements.

DETAILED DESCRIPTION

Figure 1:
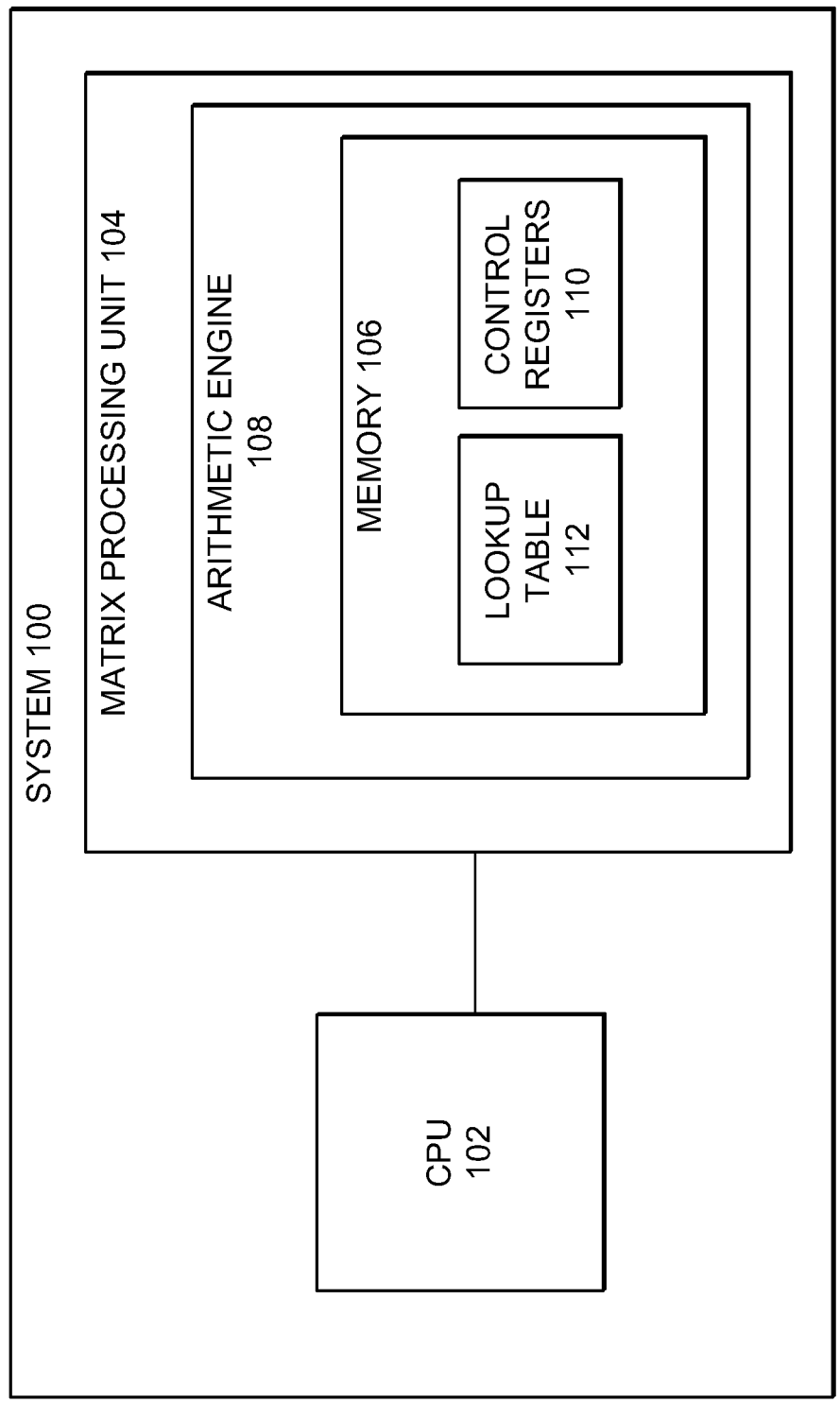
FIG. 1 illustrates a system to perform unary functions using range-specific coefficient sets in accordance with certain embodiments.

Unary functions may be realized entirely or in part with lookup tables (LUTs) present in a processor. In some systems, the LUTs may also provide the flexibility required to implement customized functions. Some processors may provide multiple different tabulated functions (e.g., functions that may utilize a lookup based on the input) that are selectable via an instruction field. When the unit of least precision (ULP) is uniform (e.g., all inputs provided to the functions have the same ULP), the LUT may be relatively easy to index. For example, the index to the LUT may simply be a right-shifted input value and the output for the function may be the value present at that location in the LUT or a linear interpolation between the selected value and the following value. However, in processors utilizing floating-point (FP) numbers as inputs, the ULP is not uniform, and the implementation of tabulated functions becomes much more difficult. Due to the variable nature of the ULP for FP inputs, a mere right-shift of the input is generally not a viable approach to determine the LUT index.

Various embodiments of the present disclosure provide robust solutions for performing unary functions having an FP number as an input. In particular embodiments of the present disclosure, unary functions are implemented by a set of power series approximations arranged successively across the possible values for the input. For example, a tabulated function result may be determined by an evaluation of a power series (e.g., of the form $a_0 + a_1 x + a_2 x^2$) where x is the (potentially manipulated) input value and $a_0$, $a_1$, and $a_2$ are coefficients from a LUT. In particular embodiments, the coefficients are determined by a two-stage process. First, the input FP value is compared against successive ranges. The start value of each range may be an arbitrary FP number while the end value of a particular range is the FP value that is one ULP less than the next range's start value. Second, once the input value's range is determined, a coefficient set (e.g., $a_0$, $a_1$, and $a_2$) is selected based on the input value's offset within the range (thus different ranges may be associated with different series of coefficient sets and different sections of a range may be associated with different coefficient sets). The number of coefficient sets per range is flexible (e.g., 0 to N, where N is any suitable integer) and may, in some embodiments, be distributed numerically uniform across the range (although non-uniform distributions are also possible). The coefficient set is then used in conjunction with the input value x to calculate the result of the unary function. As will be explained in further detail below, some functions may have one or more ranges that do not utilize coefficients or that are otherwise optimized based on the characteristics of the functions.

As described above, the input for a unary function may be a FP number. Any suitable FP numbers may be used in various embodiments, where a FP number may include significand (also referred to as mantissa) and exponent bits. The FP number may also include a sign bit. As various examples, the FP number may conform to a minifloat format (e.g., an 8 bit format), a half-precision floating-point format (FP16), a Brain Floating Point format (bfloat16), a single-precision floating-point format (FP32), a double-precision floating-point format (FP64), or other suitable FP format.

FIG. 1 illustrates a system 100 to perform unary functions using range-specific coefficient sets in accordance with certain embodiments. In the embodiment depicted, system 100 includes a central processing unit (CPU) 102 coupled to a matrix processing unit 104. Matrix processing unit 104 includes a memory 106 and an arithmetic engine 108 (in the embodiment depicted, the memory 106 is within the arithmetic engine). The memory includes control registers 110 and a lookup table 112. Arithmetic engine 108 is operable to access the lookup table 112 to obtain range-specific coefficients and perform unary functions according to the configuration of control registers 110. In various embodiments, the CPU 102 may execute code and send instructions and inputs to matrix processing unit 104, which may perform the instructions and send the results back to CPU 102. In various embodiments, the CPU 102 may request performance of a unary function by matrix processing unit 104 and the request may be passed to the arithmetic engine 108 by the matrix processing unit 104 or the CPU 102 may request some other operation and the matrix processing unit 104 may determine that a unary function is to be performed in order to execute the requested operation and may instruct the arithmetic engine 108 to perform the unary function. In various embodiments, system 100 may allow for a user to program the control registers 110 to define the functions via any suitable interface.

Although processor 100 depicts a particular embodiment, other embodiments are contemplated herein. For example, in some embodiments, the arithmetic engine 108 is not included in a matrix processing unit, but rather in a different type of processor (e.g., CPU 102 or other processor).

Each of the processors of system 100 (e.g., CPU 102, matrix processing unit 104, or other processor including an arithmetic engine 108) may comprise a microprocessor, an embedded processor, a digital signal processor (DSP), a network processor, a handheld processor, an application processor, a co-processor, a system on a chip (SOC), or other device to execute code (i.e., software instructions) and/or perform other processing operations.

CPU 102 may include one or more processing elements (e.g., cores). In one embodiment, a processing element refers to circuitry to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, processing elements that may be included in a processor may also include one or more arithmetic logic units (ALUs), floating point units (FPUs), caches, instruction pipelines, interrupt handling hardware, registers, or other hardware to facilitate the operations of the processing elements.

Matrix processing unit 104 may include circuitry to perform functions to accelerate computations associated with matrices (e.g., for deep learning applications). In various embodiments, matrix processing unit 104 may perform one or more of vector-vector operations, matrix-vector operations, and matrix-matrix operations. In particular embodiments, the matrix processing unit 104 may perform element-wise operations on matrices, such as one or more of multiplication and division, addition and subtraction, logical operators (e.g., |, &, ^, ~), arithmetic and logical shifts, comparison operators (>, <, ==, !=), random number generation, and programmable functions. In some embodiments, matrix processing unit 104 may also perform operations across elements of a matrix, such as one or more of max value and index in rows/columns/matrix, min value and index in rows/columns/matrix, and summation across rows/columns/matrix.

Arithmetic engine 108 comprises circuitry to perform one or more unary functions. In various embodiments, arithmetic engine 108 may also be operable to perform binary functions (e.g., functions that perform an operation based on two inputs). In a particular embodiment, arithmetic engine 108 is operable to perform binary functions on input data prior to matrix multiplication by the matrix processing unit 104, as well as binary and unary functions on output data after the matrix multiplication is performed. In a particular embodiment, the arithmetic engine may process 32 bfloat16 elements or 16 FP32 elements per cycle in an element-wise manner, although in other embodiments the arithmetic engine may be adapted to process other numbers of elements per cycle.

Arithmetic engine 108 may include a memory 106. In other embodiments, arithmetic engine 108 may access a memory 106 that is not part of the arithmetic engine 108. Memory 106 may comprise any non-volatile memory and/or volatile memory. Memory 106 may comprise any suitable type of memory and is not limited to a particular speed, technology, or form factor of memory in various embodiments. In the embodiment depicted, memory 106 includes control registers 110 and lookup table 112. In other embodiments, the control registers 110 and lookup table 112 may be stored in separate memories.

Lookup table 112 may include coefficient sets for one or more unary functions. For example, for a first unary function, the lookup table 112 may include a plurality of table entries, where each entry includes coefficients for a respective portion of a range of input values for the first unary function. Thus, a first table entry for a first unary function may include a set of coefficients to be used when an input value for the function is within a first portion of a first range of input values, a second entry for the first unary function may include a different set of coefficients to be used when an input value for the function is within a second portion of the first range of input values, and so on. Similarly, the lookup table 112 may include a separate series of coefficient sets for a second range of the first function, another series of coefficient sets for a third range of the first function and so on. Similarly, the lookup table 112 may include separate series of coefficient sets for other functions. In various embodiments, the entries may store compressed or uncompressed coefficients.

The coefficients may be used to define a power series used to calculate the output value of the unary function based on the input value. In a particular embodiment, the power series takes the form $a_0+a_1x+a_2x^2$ where x is the input value and $a_0$, $a_1$, and $a_2$ are a set of coefficients retrieved from the lookup table 112. In other embodiments, different power series may be used. For example, the power series may take the form $a_0+a_1x+a_2x^2+a_3x^3$. Similar power series with higher orders may be used, although the footprint of the arithmetic engine 108 increases as the power series becomes more complex due to the additional logic needed to compute the outputs as well as the increased number of coefficients to be stored in the lookup table 112.

The number of ranges and corresponding entries stored in the lookup table may vary depending on the complexity of the unary function. For example, highly optimized functions may consume very few entries (e.g., 16 or less coefficient sets) while curvy and non-symmetrical functions (e.g., sigmoid) may utilize significantly more entries (e.g., about 90 coefficient sets).

Figure 2:
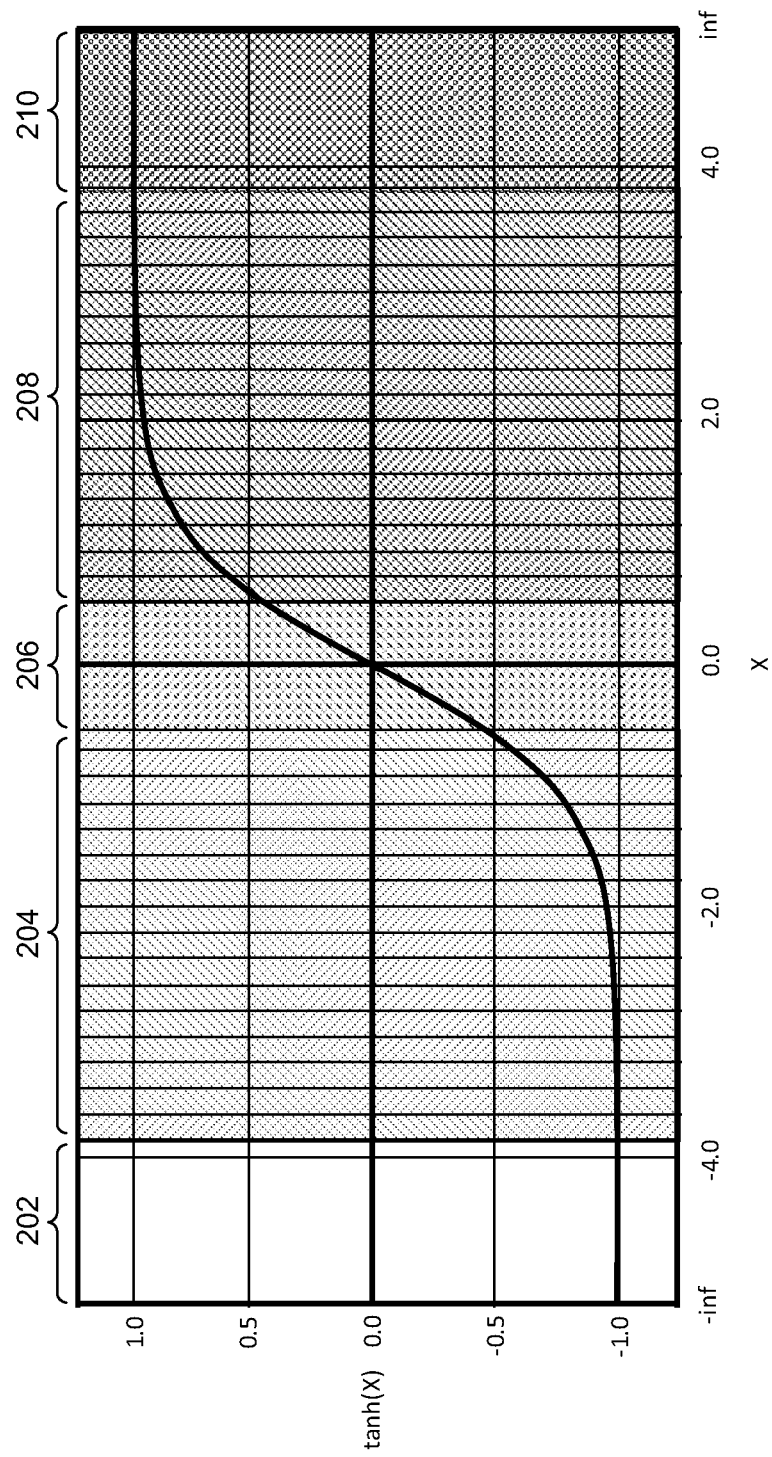
FIG. 2 illustrates multiple ranges of a unary function in accordance with certain embodiments.

FIG. 2 illustrates multiple ranges of a unary function tanh in accordance with certain embodiments. In some embodiments, the ranges depicted (202, 204, 206, 208, and 210) may each be associated with one or more coefficient sets (where the ranges may each utilize any suitable number of coefficient sets and different ranges may have different numbers of coefficient sets). Each section of a region (where a section is depicted as the area including the input values in between two thin vertical lines) may be governed by a different coefficient set. In various embodiments, the sections within a range are the same size. For example, one coefficient set may apply to x values from −2.0 to −1.8, the next coefficient set may apply to x values from −1.8 to −1.6, and so on.

In general, the sampling density (i.e., number of coefficient sets per unit of input value region) is higher for ranges with higher non-linearity. Accordingly, the number of coefficient sets used for ranges 204 and 208 is much higher than the number of coefficient sets used for the other ranges. Because range 202 is asymptotic to −1 (i.e., has a constant output value of −1 across the input values of the range), this entire range may utilize a single coefficient set where $a_0=-1$, $a_1=0$, and $a_2=0$ (assuming a power series of the form $a_0+a_1x+a_2x^2$). Similarly, because range 210 is asymptotic to 1, this entire range may also utilize a single coefficient set where $a_0=1$, $a_1=0$, and $a_2=0$. Range 206 is linear and thus may also utilize a single coefficient set where $a_0=0$, $a_1=1$, and $a_2=0$ such that in this range the output equation is simply x (i.e., the output equals the input).

The ranges depicted in FIG. 2 are examples only. In other implementations, a unary function may be broken up into more or less regions. As will be described below, further optimizations may be made to reduce the number of coefficients stored. For example, because the tanh function is symmetrical about the origin, the coefficient sets for range 208 may be reused for range 204 (with an appropriate sign change) and thus an input value falling in range 204 may result in a lookup of a coefficient set associated with range 208. As another example, for a region in which the output value is a constant (e.g., 202 and 210) or a region in which the output value is equal to the input value (e.g., 206), the range may be associated with a mode that specifies the output value and the lookup table 112 does not need to be accessed when the function is evaluated at an input within that range. Accordingly, such regions may be implemented without storing associated coefficient sets. Alternatively, such regions may be implemented according to the above example utilizing coefficient sets.

Referring again to FIG. 1, memory 106 also includes a plurality of control registers 110. These control registers define the operations for each of the unary functions implemented by the arithmetic engine 108. Examples of possible control registers are defined below, although this disclosure encompasses any suitable variations of the below or other control registers to implement functionality described herein. The actual number of bits for each register may vary, depending on the specific implementation. In a particular embodiment, each function that is implemented is associated with a respective set of registers dedicated to that function.

Enable Register—This register may be set to enable the function. In a particular embodiment, when this register is not set and a request to execute the function is received, the output value is set to not a number (NaN).

Number of Ranges Register—This register defines the number of ranges enabled for the function. 3 bits may be used for this register when the number of ranges is limited to 8, although other embodiments may allow for more or less ranges. If the function is enabled, at least one range is valid. Each function may have an associated Number of Ranges Register.

Range Mode Register—This register specifies a mode of a range and thus a plurality of these registers may be present, with each register corresponding to a different range for the function. In a particular embodiment, the modes available for selection are lookup, constant, and identity. The lookup mode specifies that a table lookup should be performed and the resulting power series should be calculated to generate the output of the function. The identity mode specifies that the output value is to be equal to the input value (and thus a lookup does not need to be performed). The constant mode specifies that a particular constant (which may be stored in one of the control registers 110 or other locale) is to be returned as the output value (and thus a lookup does not need to be performed).

Start Value Register—This register specifies the start value of the range (e.g., which may be inclusive), where the start value is the lowest input value x within the range. A plurality of these registers may be present, with each register corresponding to a different range for the function. In a particular embodiment, the start value is in the FP32 format, although other formats described herein or elsewhere may be used. The Start Value Registers may enable determination of which range an input value falls into (e.g., the FP input value may be compared against the various start values to determine which range includes the input value).

Base Address Register—This register specifies the base address of table entries in the lookup table that are assigned to a particular range. Thus, a plurality of these registers may be present, with each register corresponding to a different range for the function. The base address may be used in conjunction with the input value's location within the range to determine the address of the relevant table entry comprising the corresponding coefficient set.

Offset Value Register—This register stores an offset value (e.g., a pre-calculated integer value provided by a user) used to derive an input value's offset within the range. In an embodiment, the pre-calculated integer value may be subtracted from the input value to determine the input value's offset into the range. Thus, the offset value may be the start of the range in an integer format. A plurality of these registers may be present, with each register corresponding to a different range for the function. In a particular embodiment, when a range is set to constant mode, the constant (or a pointer to the constant) may be stored in the offset value register in place of an offset value.

Exponent Span Register—This register stores a value representing the exponent "span" of the range (e.g., the largest possible exponent value of input values that fall within the range, as the range may span multiple exponents in some cases). When a function utilizes a reduction operation, this value may be zero since the input is normalized to a number between 1 and 2 prior to the lookup. The value stored in the exponent span register may allow input values within the range to be converted to the same exponent such that the offset value (which may be an integer) may be applied to any of the input values, regardless of whether the input values have different exponent values. A plurality of these registers may be present, with each register corresponding to a different range for the function.

Shift Register—This register stores a value representing a shift amount applied to an input value's offset within a range (e.g., the value obtained after subtracting the offset value from the input value). In some embodiments, this value may be provided by a user. In a particular embodiment, this value is based on the number of coefficient sets within the range. For example, the value written to the Shift Register may be z, when $2^z$ represents the number of coefficient sets within the range and the actual shift amount is determined by subtracting z from another number y (e.g., indicating the number of bits representing a mantissa or normalized mantissa). A plurality of these registers may be present, with each register corresponding to a different range for the function.

Symmetry Mode Register—This register specifies the symmetry of a function. For example, the symmetry mode may be none, y-axis, or origin. Some unary functions (e.g., some deep learning functions) have symmetry, so instead of storing coefficient sets for corresponding negative and positive ranges, a single series of sets may be stored for both ranges. When the symmetry mode is none, no symmetry optimization is applied. When the symmetry mode is y-axis, the function may be evaluated using the absolute value of the input value. When the symmetry mode is origin, the function may be evaluated using the absolute value of the input value and the sign of the output is then flipped if the original input was negative to produce the final output. Each function may have its own Symmetry Mode Register.

In a particular embodiment, a value in this register (or other register) may specify some other custom mode for the function. For example, a neg_as_nan mode may specify that if the input value is negative, a lookup should not be performed, but NaN should be returned as the output (e.g., such a mode may be useful when the function is sqrt(x) or other function that does not operate on negative numbers).

Special Case Registers—These registers may specify whether special case handling should be applied when a particular input value is received (e.g., exactly zero, +infinity, or −infinity) for a function. For example, for a particular input value, a special case register may specify that no special handling applies or that a cached predefined constant should be returned as the output value without performing a lookup. Alternatively, a special case register may specify that NaN should be returned (e.g., when the function is a reciprocal operation and the input is 0).

Function Mode Register—specifies function-specific optimization (if any). For example, for some well known functions (e.g., sqrt(x), 1/x, 1/sqrt(x), $\log_2(x)$, $2^x$), the exponent of the result (or a value very close to it) can be derived algorithmically with reasonably trivial extra logic (e.g. 8-bit integer addition). In such a case, the lookup operation and power series calculation can be limited to cover the input mantissa (accordingly, the input value may be reduced via a reduction operation to a value between 1 and 2) or other portion of the input value, which can dramatically reduce the number of lookup table entries needed for the function. In some situations, the function mode may override other modes specified via the control registers (e.g., for the function 1/x, the symmetry mode may be forced to origin regardless of the setting of the symmetry mode). Operation of the function-specific optimization will be described in more detail in connection with FIG. 4.

Compression Mode—This register specifies a decompression algorithm for a lookup table entry (if the coefficients are compressed in the lookup table). In a particular embodiment, two compression modes are used. A first compression mode puts a limitation on the range of coefficients, but generates precise outputs, whereas a second compressions mode does not constrain the range of coefficients and thus allows a full range of floating point inputs, at the cost of less precise outputs. In a particular embodiment, each entry of the lookup table includes data for three coefficients which are decompressed (e.g., from 64 bits to 96 bits) according to the decompression algorithm specified.

Figure 3:
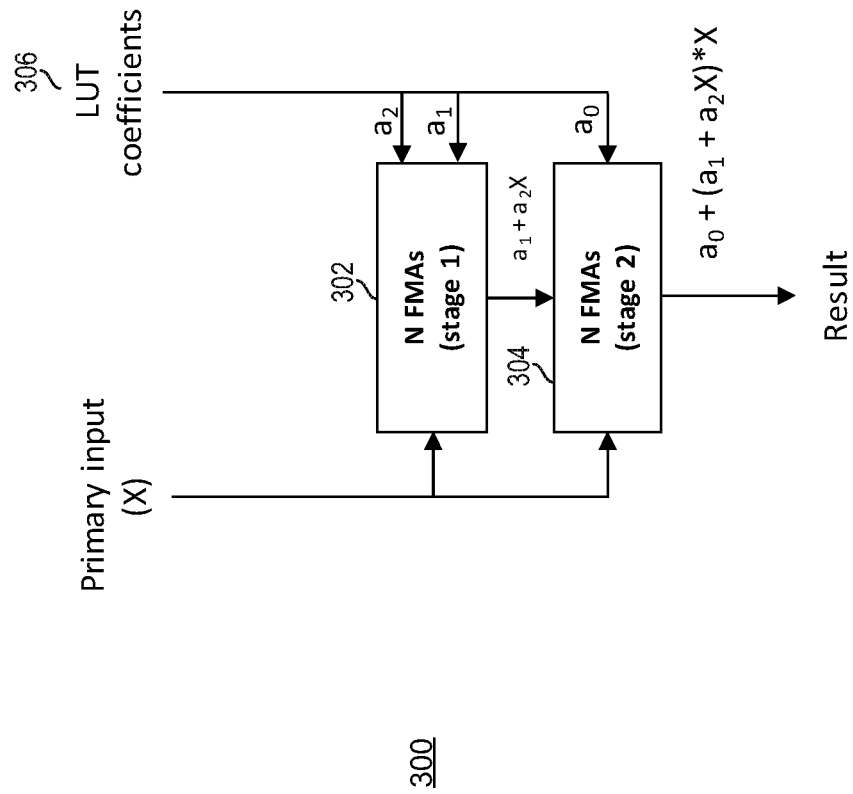
FIG. 3 illustrates a first arithmetic engine in accordance with certain embodiments.

FIG. 3 depicts an arithmetic engine 300 in accordance with certain embodiments. Arithmetic engine 300 may include any of the characteristics of arithmetic engine 108 and vice versa. In the embodiment depicted, the arithmetic engine 300 includes two stages of fused multiply-adders (FMAs) 302 and 304. Each stage has N FMAs, where N is any suitable integer and each FMA can operate on a separate input value x (e.g., an element of a vector or matrix), thus N independent LUTs may be processed in parallel (e.g., via a single instruction, multiple data SIMD approach).

In the embodiment depicted, the power series implemented is of the form $a_0+a_1x+a_2x^2$, which is equivalent to the result shown $(a_0+(a_1+a_2x)*x)$. The LUT coefficients 306 are obtained from the lookup table 112. The input x and the coefficients $a_1+a_2$ are supplied to the first stage to generate an intermediate result $(a_1+a_2x)$. This intermediate result is then supplied to the second stage along with the input x and the coefficient $a_0$ to generate the final result.

Although a particular embodiment is depicted, other embodiments may include any other suitable circuitry to calculate the power series result. For example, circuitry other than FMAs may be used. As alluded to above, other embodiments may evaluate different power series. For example, another stage of FMAs could be added to the arithmetic engine 300 to evaluate the power series $a_0+a_1x+a_2x^2+a_3x^3$. In general, an arithmetic engine 108 including N stages of FMAs may calculate output values according to a power series to the power of N.

Figure 4:
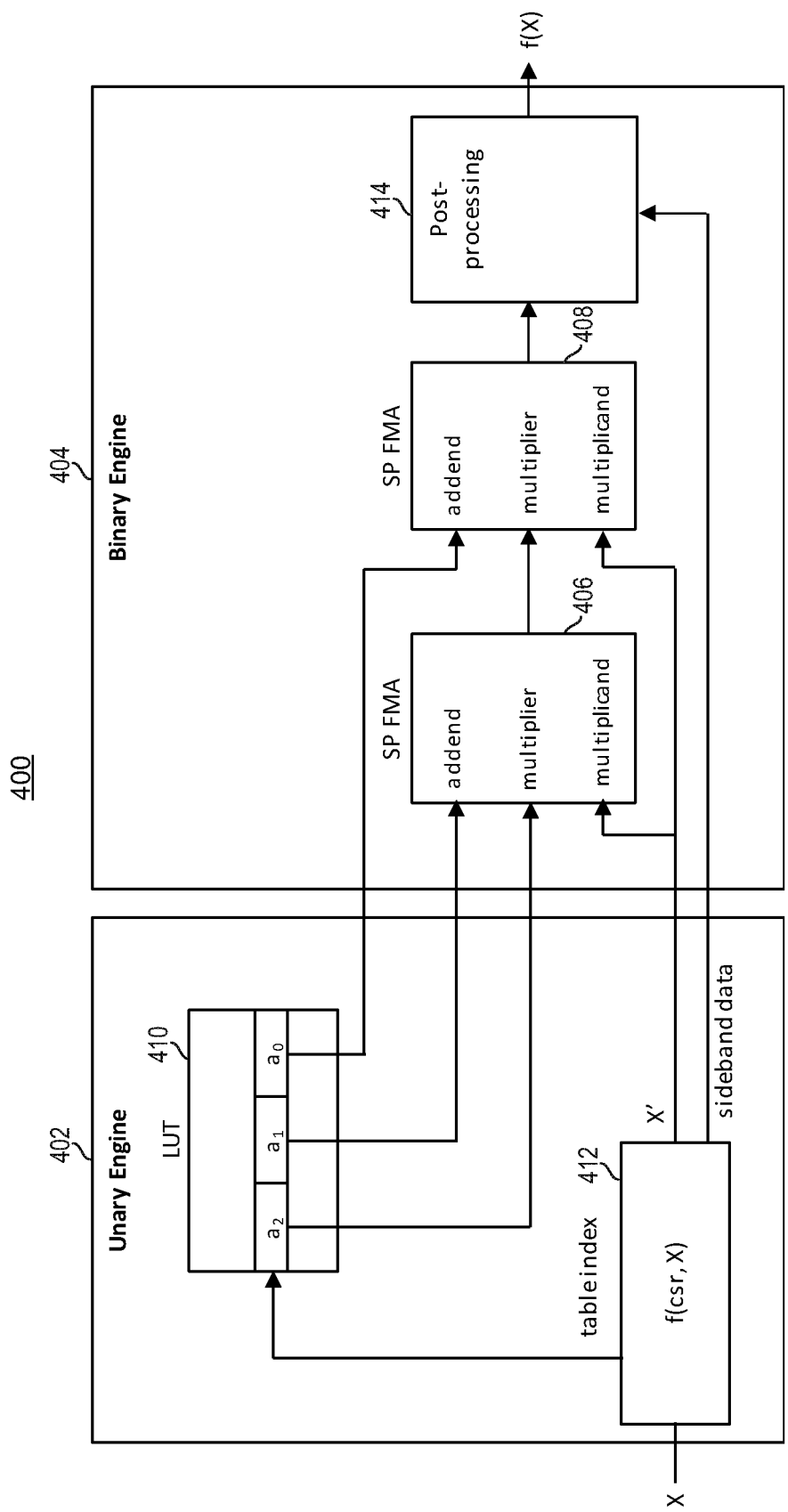
FIG. 4 illustrates a second arithmetic engine in accordance with certain embodiments.

FIG. 4 illustrates an arithmetic engine 400 in accordance with certain embodiments. Arithmetic engine 400 may include any of the characteristics of arithmetic engine 108 and vice versa. The depicted arithmetic engine 400 includes a unary engine 402 and a binary engine 404. In various embodiments, the unary engine 402 may include circuitry dedicated to performing unary functions while the binary engine 404 may include circuitry that may support unary functions as well as binary functions (although not shown, the inputs to the single precision (SP) FMAs 406 and 408 may also be coupled to other inputs when performing binary functions). In other embodiments, the components shown may be included within any suitable arithmetic engine or other system or device (e.g., the components shown within binary engine 404 do not necessarily need to be included within a binary engine).

In an embodiment, unary engine 402 may produce coefficients ($a_0$, $a_1$, and $a_2$ in this embodiment) and perform the optimizations specified by the control registers described above. In the depicted embodiment, unary engine 402 may include lookup table 410 (which may have any characteristics of lookup table 112). Although not shown, the unary engine 402 may also include control registers (e.g., any of control registers 110).

In the depicted embodiment, unary engine 402 also includes control module 412. The control module 412 may receive an input value x and an indication of a unary function to be performed on x. The control module 412 may access the control registers (csr) to determine how to process the input. For example, the control module 412 may determine which range the input value corresponds to (e.g., by comparing the input value against one or more Start Value Registers associated with the unary function). The control module 412 may also determine range-specific behavior. For example, the control module 412 may determine whether a lookup is to be performed. If a lookup is to be performed, the control module 412 calculates an address (depicted as "table index") into the LUT 410 based on the input value x and information available in the control registers. This address is passed to the LUT 410 and the corresponding coefficients are retrieved from the LUT 410. The control module 412 may also be operable to retrieve a constant or other value (e.g., NaN) when a lookup is not performed (e.g., when the input falls in a range which has a single output) or to output the input value when the control registers specify an identity mode for the range (or to instruct post-processing module 414 to do so).

In some embodiments, the control module 412 may determine whether a reduction operation is to be performed. For example, as explained above, for some functions the exponent of a result may be easily calculated and thus the power series may simply operate on the mantissa (or other reduced portion of the input value) of the input value as opposed to the entire input value. When control module 412 determines that a reduction operation is to be performed, the control module 412 may extract the reduced value (e.g., mantissa) from the input value and output the reduced value as x'. The exponent (e.g., the actual exponent of the input x or an exponent based on a multiplier applied to the input x to reduce the input x to a value between, e.g., 1 and 2) and the sign of the input may also be output by the control module 412 as "sideband data." In some embodiments, the sideband data may also include any suitable information to allow the post-processing module 414 to calculate the final exponent and sign (e.g., an indication of the unary function or an indication of the operations to be performed to the exponents and/or sign). In some embodiments, the sideband data may include information indicating that the output should be converted to a particular value (e.g., NaN when the output is not valid, such as when the function is square root and the input value is negative).

When control module 412 determines that a reduction operation is not to be performed, the control module 412 may output the input value x as x' (and the sideband data may be omitted or set to a value indicating that there is no sideband data).

FMAs 406 and 408 may operate in a manner similar to that described above with respect to FMAs 302 and 304, regardless of whether x' is the actual input value or the reduced input value. Although the FMAs 406 and 408 are illustrated as single precision FMAs, the FMAs may be configured to operate on any suitable number format. The output of FMA 408 may be supplied to post-processing module 414 for any processing to be performed before the final output value is output by the arithmetic engine 400.

In various embodiments, the arithmetic engine 400 may be able to perform unary functions on a plurality of different input formats. For example, when operating on input values with a shorter format (e.g., bfloat16), the input values may be upconverted to a longer format (e.g., FP32), and the same circuitry FMAs may be used as when the input values arrive in the longer format. If the shorter format is desired for the output, then the arithmetic engine 400 (e.g., via post-processing module 414) may inline downconvert the result.

In various embodiments, denormals and NaNs may be handled by the arithmetic engine in any suitable manner. For example, denormal input values may be converted to 0 (e.g., +0) prior to processing and final results in the denormal range may be flushed to signed 0 (except in the case where the selected range is in constant mode and the constant has been programmed to a denormal value). As another example, input NaN values may be quieted if necessary and propagated to the result. Quiet NaNs of the real indefinite type may be generated for various invalid processing cases (e.g., when the input value did not fall in any defined range portion).

Figure 5:
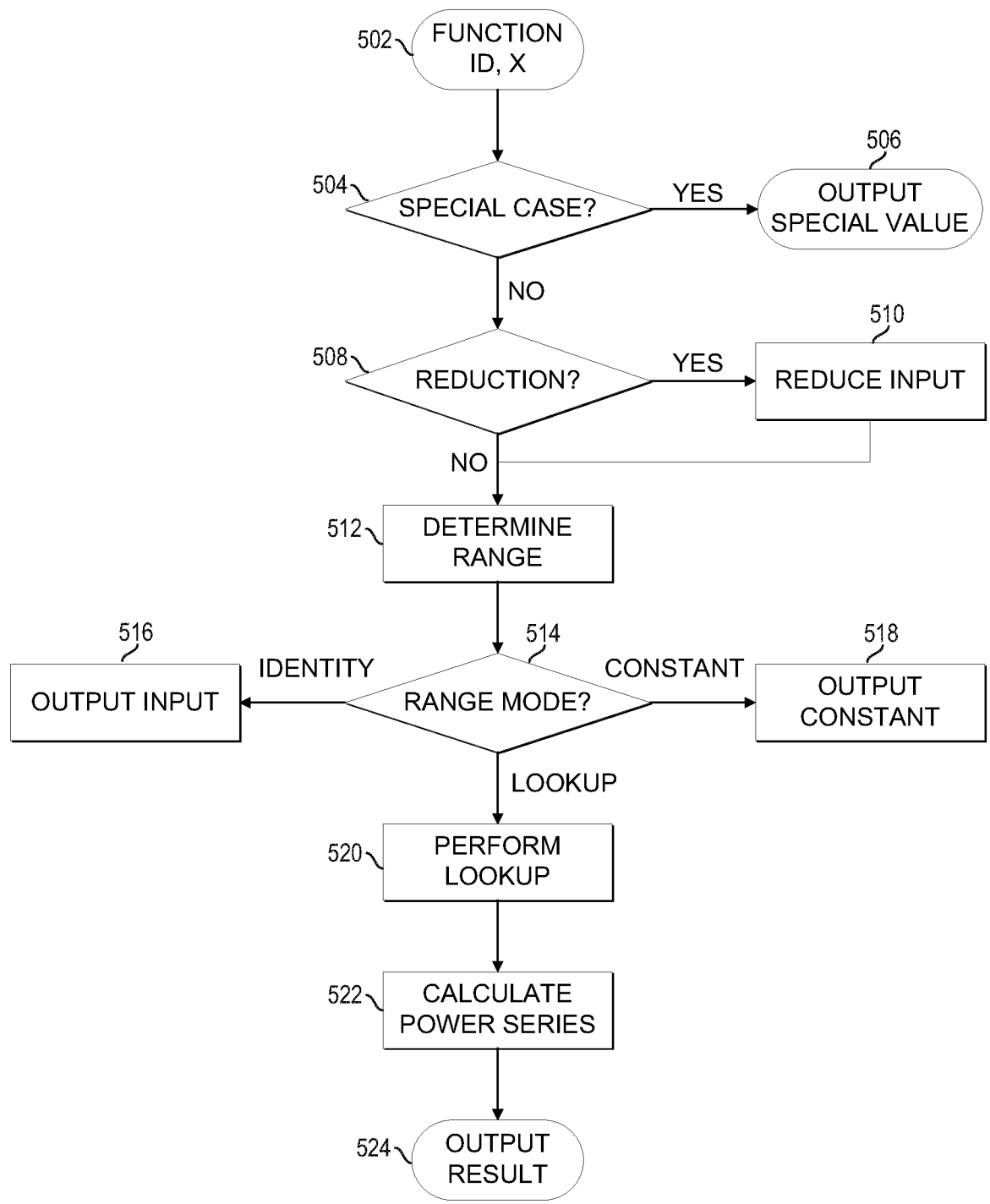
FIG. 5 illustrates a first flow for performing unary functions using range-specific coefficient sets in accordance with certain embodiments.

FIG. 5 illustrates a flow 500 for performing unary functions using range-specific coefficient sets in accordance with certain embodiments. In various embodiments, the flow may be performed by an arithmetic engine 108 and/or other suitable logic comprising circuitry.

At 502, an identification of a function and an input value x is received. At 504, a determination is made as to whether a special case applies to the input value. For example, a register may be checked to see if the input value matches a value for which a special case applies (e.g., exactly zero, +infinity, or −infinity). If a special case applies, then the corresponding special value is output at 506 and the flow ends. If a special case does not apply, the flow moves to 508.

At 508, a determination as to whether a reduction is to be applied to the input value. If a reduction is to be applied, the input value is reduced at 510. In a particular embodiment, this involves extracting the mantissa of the input value and placing the exponent and the sign of the input value into sideband data for subsequent processing. After the reduction (or in the case that no reduction is to be performed), the flow moves to 512.

At 512, a range of the function is identified based on the input value. At 514, a mode of the identified range is determined. If the mode is identity mode, the input value is output at 516 and the flow ends. If the mode is constant mode, the associated constant is retrieved and output at 518 and the flow ends.

If the mode is lookup mode, a lookup is performed at 520. This may include determining an address of a lookup table based on the starting address of the range and the offset of the input value within the range. The lookup may return a set of coefficients. At 522, a power series defined by the coefficients is calculated for the input value. The result is output at 524 and the flow ends.

Figure 6:
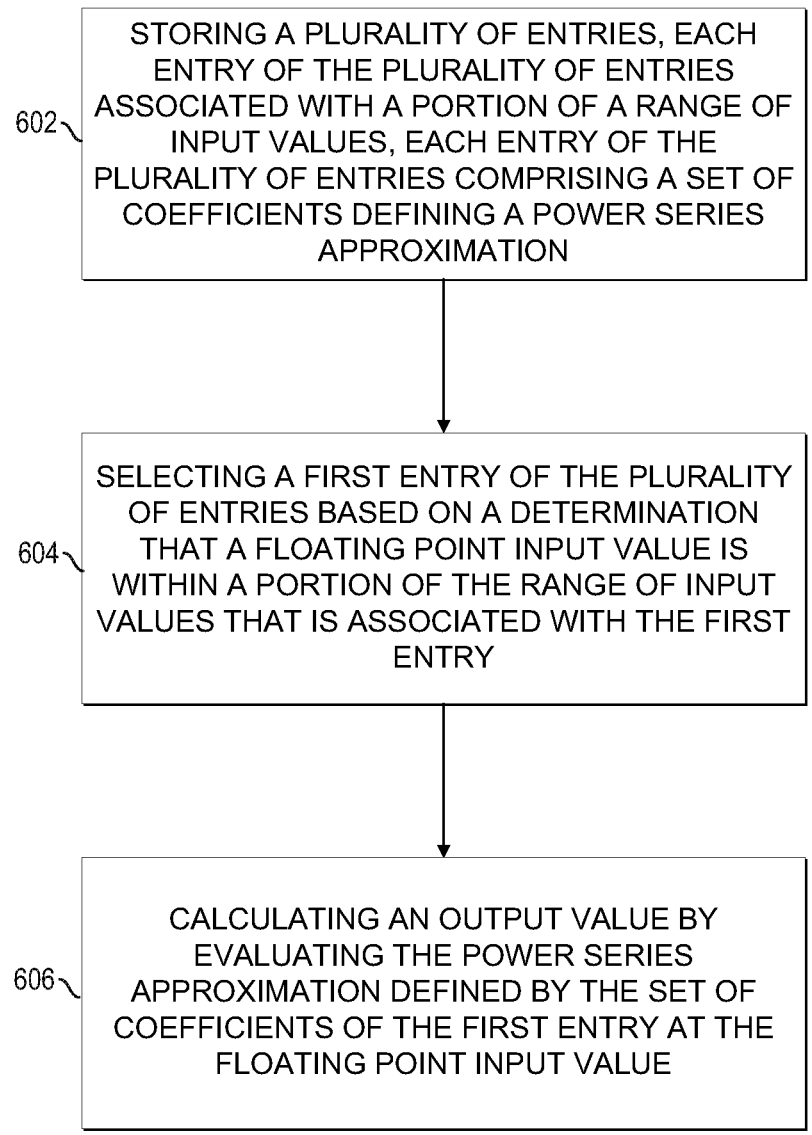
FIG. 6 illustrates a second flow for performing unary functions using range-specific coefficient sets in accordance with certain embodiments.

FIG. 6 illustrates a flow 600 for performing unary functions using range-specific coefficient sets in accordance with certain embodiments. 602 includes storing a plurality of entries, each entry of the plurality of entries associated with a portion of a range of input values, each entry of the plurality of entries comprising a set of coefficients defining a power series approximation. 604 includes selecting a first entry of the plurality of entries based on a determination that a floating point input value is within a portion of the range of input values that is associated with the first entry. 606 includes calculating an output value by evaluating the power series approximation defined by the set of coefficients of the first entry at the floating point input value.

The flows described in FIGS. 2-6 are merely representative of operations that may occur in particular embodiments.

In other embodiments, additional operations may be performed. Various embodiments of the present disclosure contemplate any suitable signaling mechanisms for accomplishing the functions described herein. Some of the operations illustrated in FIGS. 2-6 may be repeated, combined, modified, or omitted where appropriate. Additionally, operations may be performed in any suitable order without departing from the scope of particular embodiments.

The FIGs. below detail exemplary architectures and systems to implement embodiments of the above. For example, matrix processing unit 104 and/or arithmetic engine 108 may be included within or coupled to any of the processors or systems illustrated below. In some embodiments, one or more hardware components and/or instructions described above are emulated as detailed below, or implemented as software modules.

Figure 7:
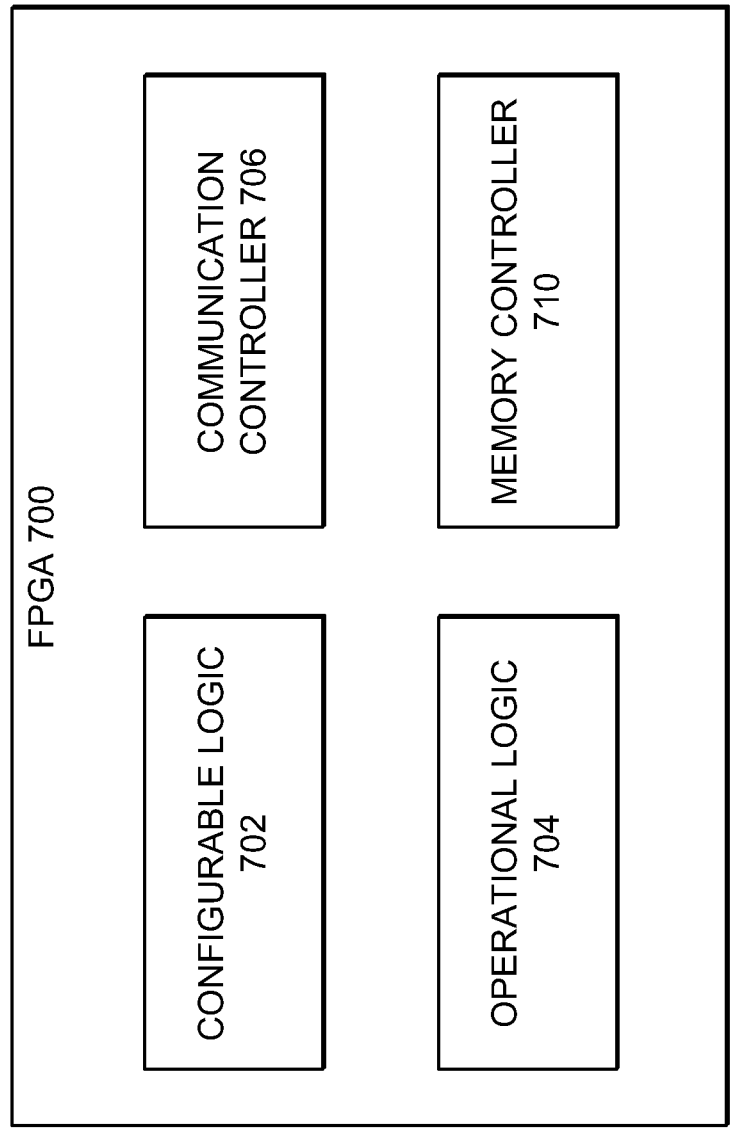
FIG. 7 illustrates an example field-programmable gate array (FPGA) in accordance with certain embodiments.

FIG. 7 illustrates a field programmable gate array (FGPA) 700 in accordance with certain embodiments. In a particular embodiment, arithmetic engine 108 may be implemented by an FPGA 700 (e.g., the functionality of the arithmetic engine 108 may be implemented by circuitry of operational logic 704). An FPGA may be a semiconductor device that includes configurable logic. An FPGA may be programmed via a data structure (e.g., a bitstream) having any suitable format that defines how the logic of the FPGA is to be configured. An FPGA may be reprogrammed any number of times after the FPGA is manufactured.

In the depicted embodiment, FPGA 700 includes configurable logic 702, operational logic 704, communication controller 706, and memory controller 710. Configurable logic 702 may be programmed to implement one or more kernels. A kernel may comprise configured logic of the FPGA that may receive a set of one or more inputs, process the set of inputs using the configured logic, and provide a set of one or more outputs. The kernel may perform any suitable type of processing. In various embodiments, a kernel may comprise a prefix decoder engine. Some FPGAs 700 may be limited to executing a single kernel at a time while other FPGAs may be capable of executing multiple kernels simultaneously. The configurable logic 702 may include any suitable logic, such as any suitable type of logic gates (e.g., AND gates, XOR gates) or combinations of logic gates (e.g., flip flops, look up tables, adders, multipliers, multiplexers, demultiplexers). In some embodiments, the logic is configured (at least in part) through programmable interconnects between logic components of the FPGA.

Operational logic 704 may access a data structure defining a kernel and configure the configurable logic 702 based on the data structure and perform other operations of the FPGA. In some embodiments, operational logic 704 may write control bits to memory (e.g., nonvolatile flash memory or SRAM based memory) of the FPGA 700 based on the data structure, wherein the control bits operate to configure the logic (e.g., by activating or deactivating particular interconnects between portions of the configurable logic). The operational logic 704 may include any suitable logic (which may be implemented in configurable logic or fixed logic), such as one or more memory devices including any suitable type of memory (e.g., random access memory (RAM)), one or more transceivers, clocking circuitry, one or more processors located on the FPGA, one or more controllers, or other suitable logic.

Communication controller 706 may enable FPGA 700 to communicate with other components (e.g., a compression engine) of a computer system (e.g., to receive commands to compress data sets). Memory controller 710 may enable the FPGA to read data (e.g., operands or results) from or write data to memory of a computer system. In various embodiments, memory controller 710 may comprise a direct memory access (DMA) controller.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression and/or decompression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
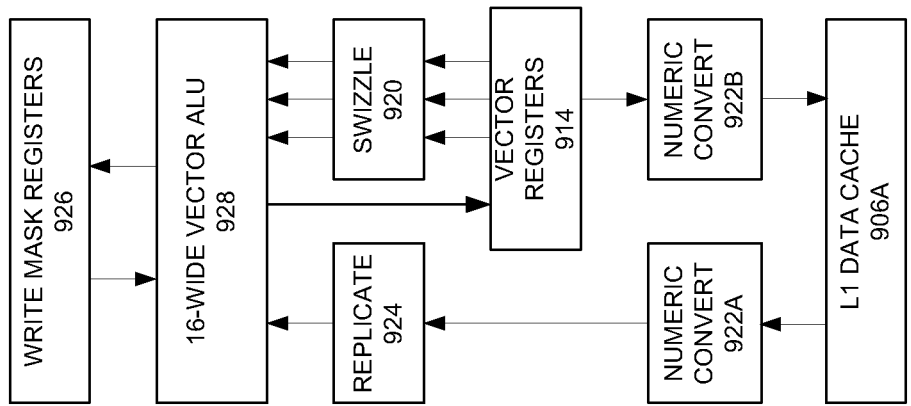
FIGS. 9A-B illustrate block diagrams of a more specific exemplary in-order core architecture, which core would be one of several logic blocks (potentially including other cores of the same type and/or different types) in a chip in accordance with certain embodiments.
Figure 9A:
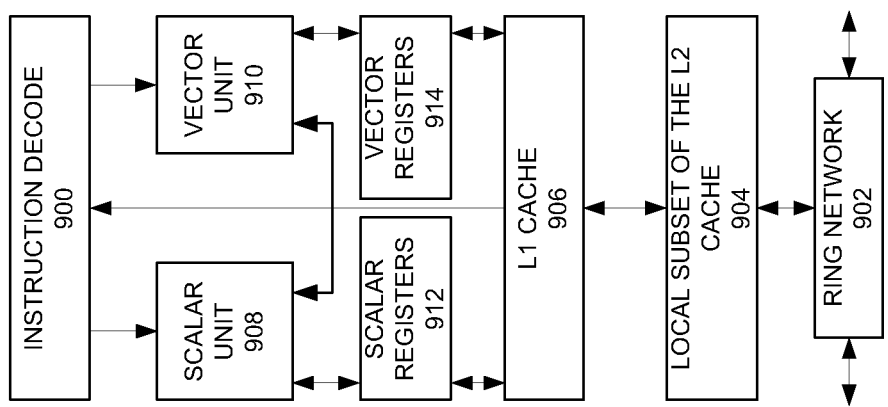

FIGS. 9A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to various embodiments. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments may use a different approach (e.g., use a single register set or include a communication path that allow data to be transferred between the two register files without being written and read back).

The local subset of the L2 cache 904 is part of a global L2 cache that is divided into separate local subsets (in some embodiments one per processor core). Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 9B is an expanded view of part of the processor core in FIG. 9A according to embodiments. FIG. 9B includes an L1 data cache 906A (part of the L1 cache 906), as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
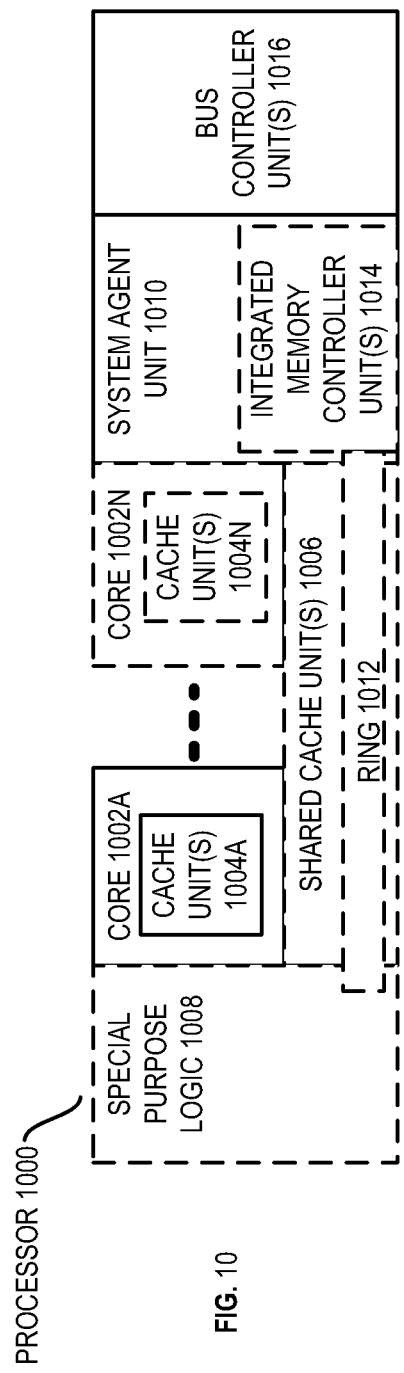
FIG. 10 is a block diagram of a processor that may have more than one core, may have an integrated memory controller, and may have integrated graphics in accordance with certain embodiments.

FIG. 10 is a block diagram of a processor 1000 that may have more than one core, may have an integrated memory controller, and may have integrated graphics according to various embodiments. The solid lined boxes in FIG. 10 illustrate a processor 1000 with a single core 1002A, a system agent 1010, and a set of one or more bus controller units 1016; while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, or a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 1000 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the special purpose logic (e.g., integrated graphics logic) 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the special purpose logic 1008. The display unit is for driving one or more externally connected displays.

The cores 1002A-N may be homogenous or heterogeneous in terms of architecture instruction set; that is, two or more of the cores 1002A-N may be capable of executing the same instruction set, while others may be capable of executing only a subset of that instruction set or a different instruction set.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 11:
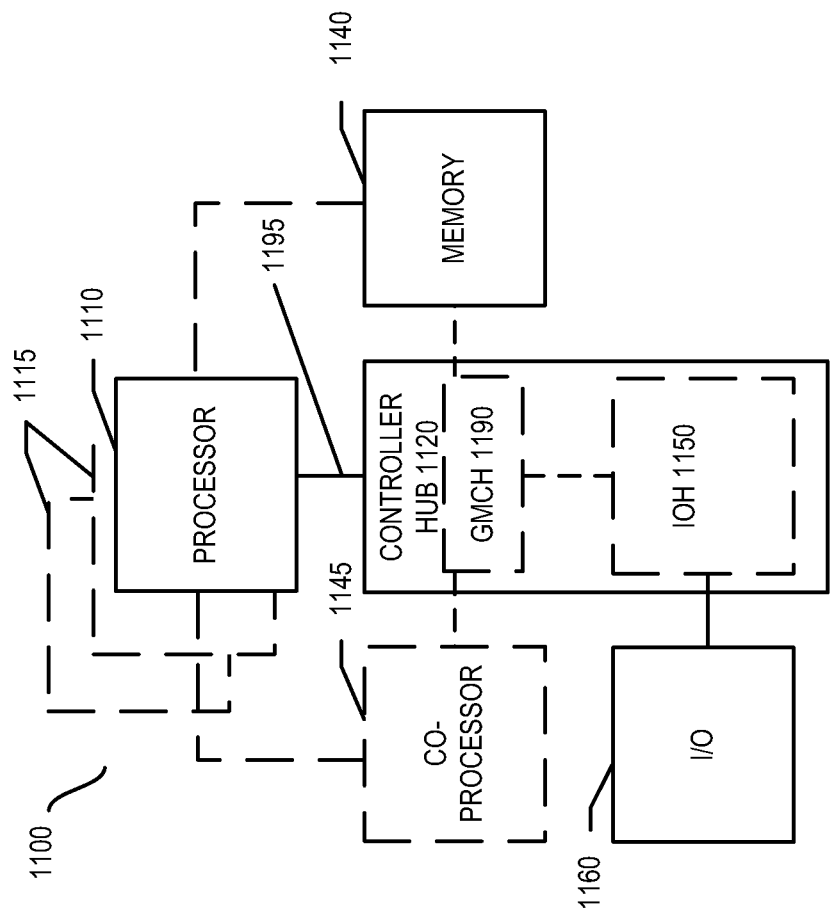
FIGS. 11, 12, 13, and 14 are block diagrams of exemplary computer architectures in accordance with certain embodiments.

FIG. 11 depicts a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips or the same chip); the GMCH 1190 includes memory and graphics controllers coupled to memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 is a single chip comprising the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), other suitable memory, or any combination thereof. The memory 1140 may store any suitable data, such as data used by processors 1110, 1115 to provide the functionality of computer system 1100. For example, data associated with programs that are executed or files accessed by processors 1110, 1115 may be stored in memory 1140. In various embodiments, memory 1140 may store data and/or sequences of instructions that are used or executed by processors 1110, 1115.

In at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression and/or decompression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
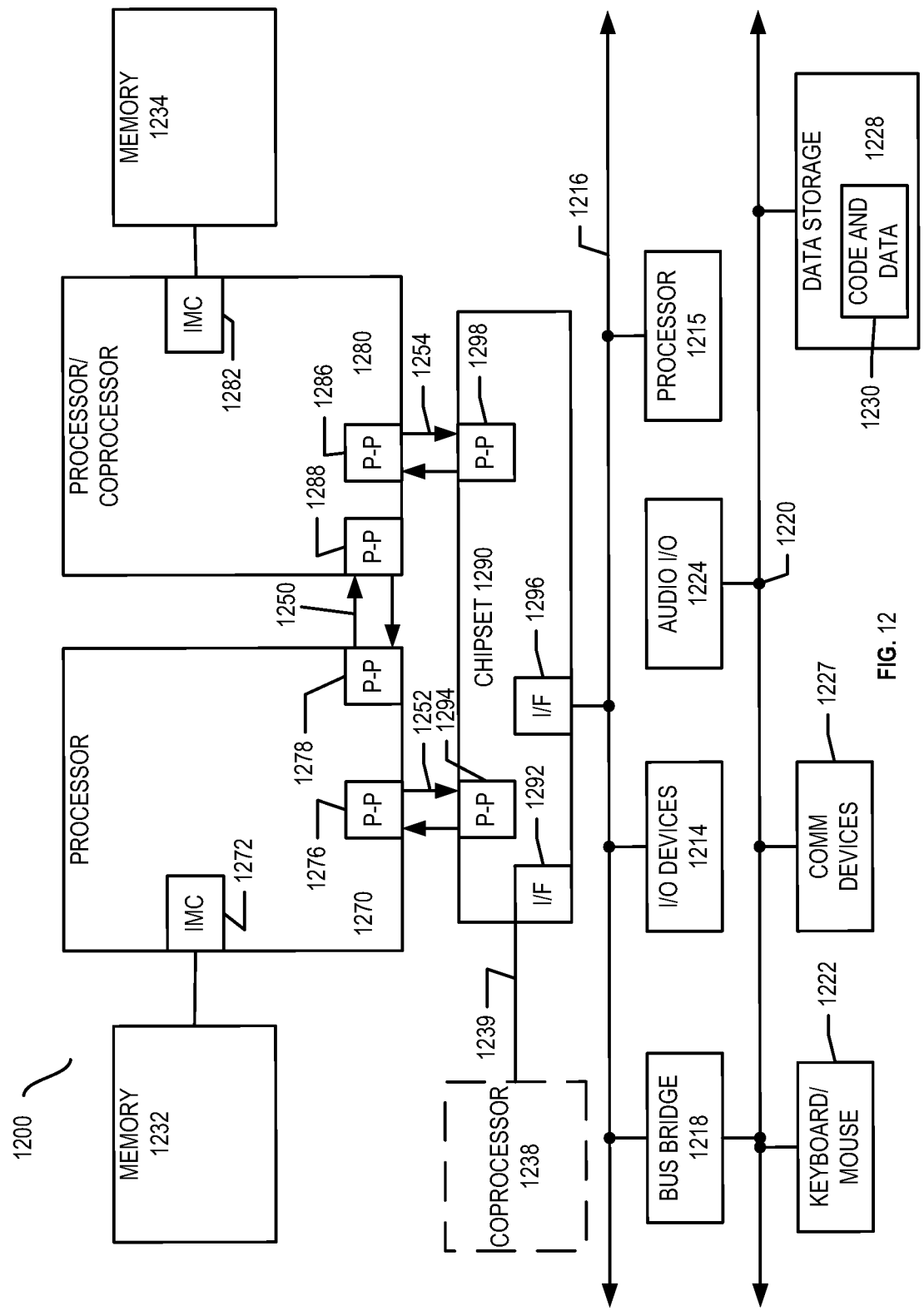

FIG. 12 depicts a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 and coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are contemplated by this disclosure. For example, instead of the point-to-point architecture of FIG. 12, a system may implement a multi-drop bus or other such architecture.

Figure 13:
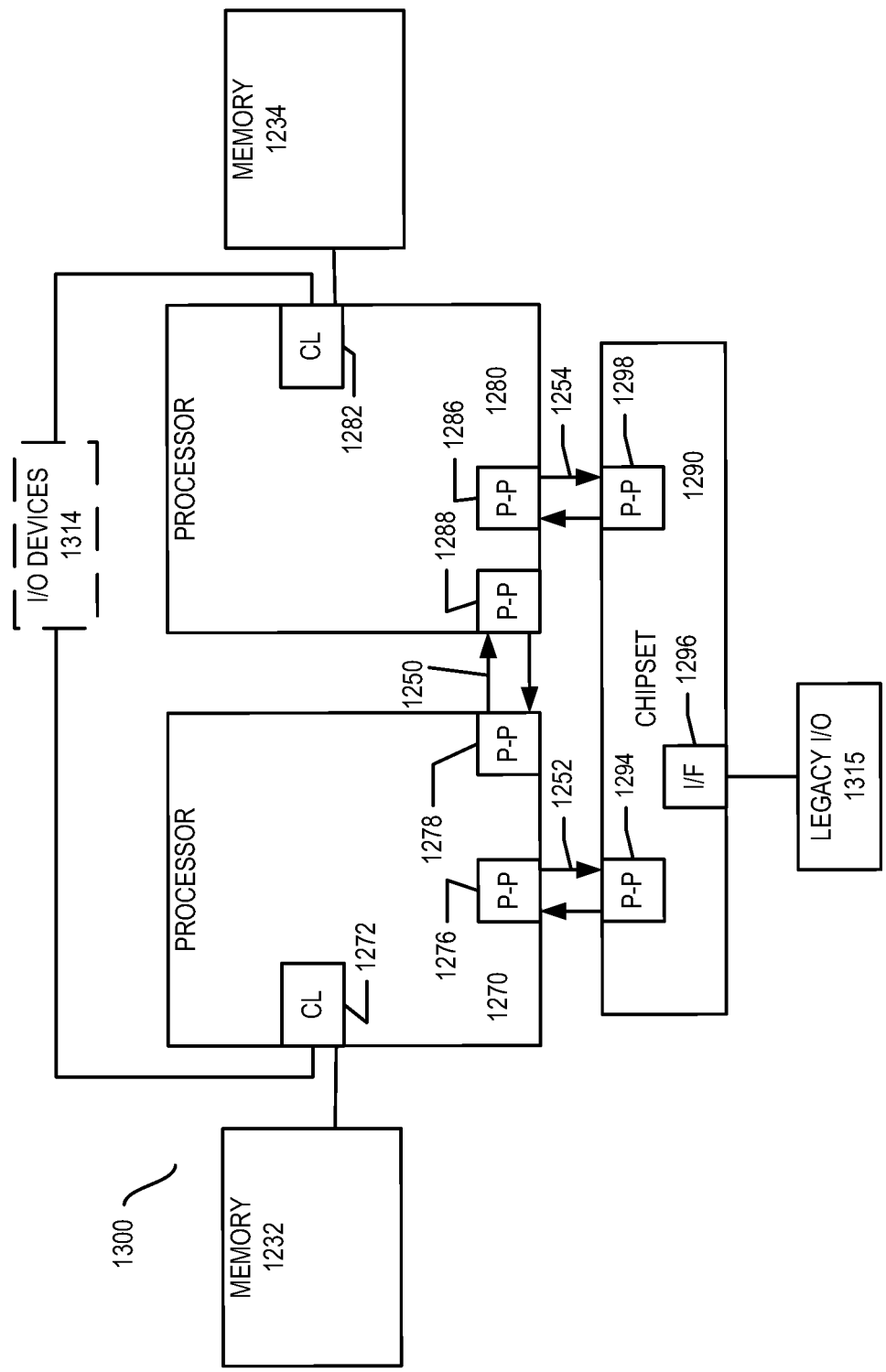

FIG. 13 depicts a block diagram of a second more specific exemplary system 1300 in accordance with an embodiment of the present disclosure. Similar elements in FIGS. 12 and 13 bear similar reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
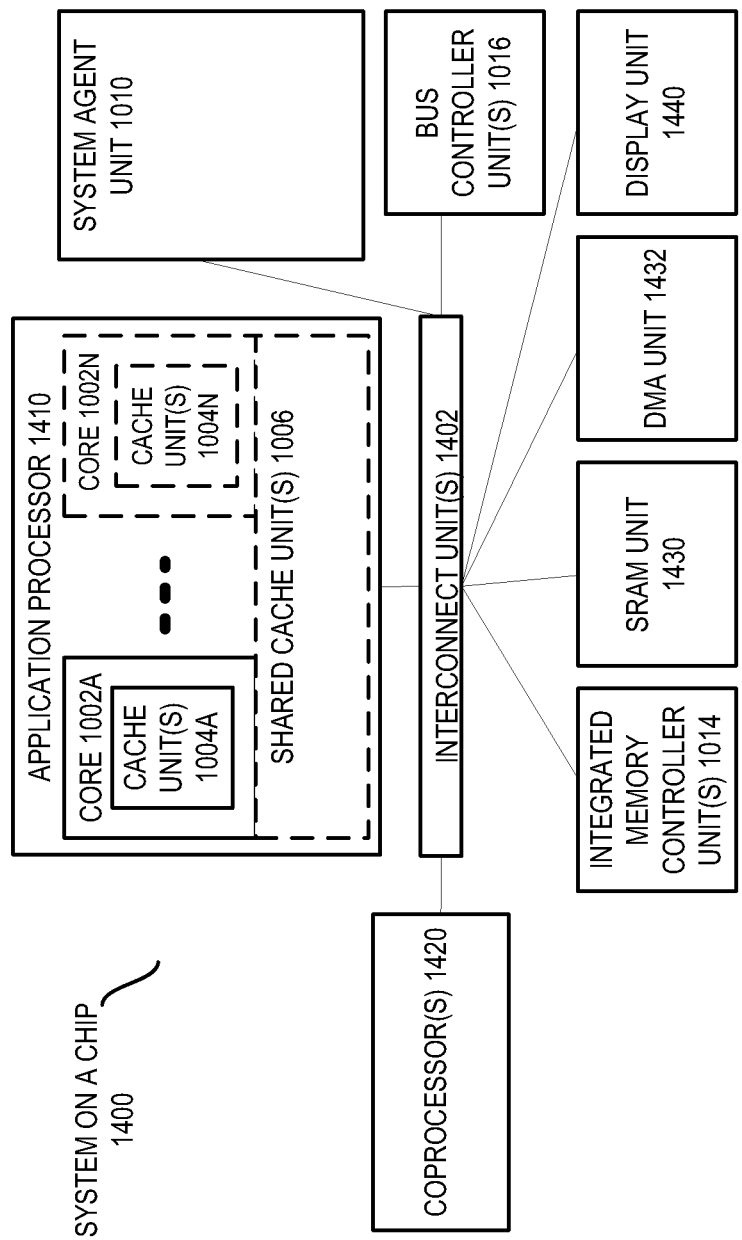

FIG. 14 depicts a block diagram of a SoC 1400 in accordance with an embodiment of the present disclosure. Similar elements in FIG. 10 bear similar reference numerals. Also, dashed lined boxes are optional features on more advanced SoCs. In FIG. 14, an interconnect unit(s) 1402 is coupled to: an application processor 1410 which includes a set of one or more cores 1002A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Any suitable logic may be used to implement any of the functionality of the various components such as CPU 102, matrix processing unit 104, arithmetic engine 104, memory 106, FMAs 302, 304, 406, and 408, control module 412, lookup table 112 or 410, control registers 110, post-processing module 414, FPGA 700, other component described herein, or any subcomponent of any of these components. "Logic" may refer to hardware, firmware, software and/or combinations of each to perform one or more functions. As an example, logic may include hardware, such as a microcontroller or processor, associated with a non-transitory medium to store code adapted to be executed by the microcontroller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is a processor comprising a memory to store a plurality of entries, each entry of the plurality of entries associated with a portion of a range of input values, each entry of the plurality of entries comprising a set of coefficients defining a power series approximation; and an arithmetic engine comprising circuitry to select a first entry of the plurality of entries based on a determination that a floating point input value is within a portion of the range of input values that is associated with the first entry; and calculate an output value by evaluating the power series approximation defined by the set of coefficients of the first entry at the floating point input value.

Example 2 may include the subject matter of example 1, the arithmetic engine to select a second entry of the plurality of entries based on a determination that a second floating point input value is within a portion of the range of input values that is associated with the second entry; and calculate a second output value by evaluating the power series approximation defined by the set of coefficients of the second entry at the second floating point input value.

Example 3 may include the subject matter of any of examples 1-2, wherein the evaluated power series approximation is $a_0+a_1x+a_2x^2$, wherein x is the floating point input value and $a_0$, $a_1$, and $a_2$ are the set of coefficients of the first entry.

Example 4 may include the subject matter of any of examples 1-3, wherein the range is a first range of a plurality of ranges and wherein the arithmetic engine is to determine that the floating point input value is within the first range by comparing the floating point input value to a plurality of start values of the plurality of ranges.

Example 5 may include the subject matter of example 4, wherein the memory is to store a second plurality of entries, each entry of the second plurality of entries associated with a portion of a second range of input values, each entry of the plurality of second entries comprising a set of coefficients defining a power series approximation.

Example 6 may include the subject matter of any of examples 1-5, wherein the selection of the first entry is further based on a determination that a request specifies a first unary function of a plurality of unary functions executable by the arithmetic engine.

Example 7 may include the subject matter of example 6, wherein the arithmetic engine is to extract a mantissa from a second floating point input responsive to a request specifying a second unary function of the plurality of unary functions; and evaluate a power series approximation on the extracted mantissa exclusive of an exponent and sign of the second floating point input, wherein the power series approximation is defined by coefficients retrieved from the memory based on the second floating point input.

Example 8 may include the subject matter of any of examples 1-7, wherein the arithmetic engine is to determine that a second floating input value corresponds to a special case and output a value corresponding to the special case.

Example 9 may include the subject matter of any of examples 1-8, wherein the range is a first range of a plurality of ranges associated with a unary function, and the arithmetic engine is to determine that a second floating point input is within a second range of the plurality of ranges; determine that the second range is specified to operate in a constant mode; and output a constant associated with the second range as a second output value.

Example 10 may include the subject matter of any of examples 1-9, wherein the range is a first range of a plurality of ranges associated with a unary function, and the arithmetic engine is to determine that a second floating point input is within a second range of the plurality of ranges; determine that the second range is specified to operate in an identity mode; and output the second floating point input as a second output value.

Example 11 is a method comprising storing a plurality of entries, each entry of the plurality of entries associated with a portion of a range of input values, each entry of the plurality of entries comprising a set of coefficients defining a power series approximation; selecting a first entry of the plurality of entries based on a determination that a floating point input value is within a portion of the range of input values that is associated with the first entry; and calculating an output value by evaluating the power series approximation defined by the set of coefficients of the first entry at the floating point input value.

Example 12 may include the subject matter of example 11, the method further comprising selecting a second entry of the plurality of entries based on a determination that a second floating point input value is within a portion of the range of input values that is associated with the second entry; and calculating a second output value by evaluating the power series approximation defined by the set of coefficients of the second entry at the second floating point input value.

Example 13 may include the subject matter of any of examples 11-12, wherein the evaluated power series approximation is $a_0+a_1x+a_2x^2$, wherein x is the floating point input value and $a_0$, $a_1$, and $a_2$ are the set of coefficients of the first entry.

Example 14 may include the subject matter of any of examples 11-13, wherein the range is a first range of a plurality of ranges and further comprising determining that the floating point input value is within the first range by comparing the floating point input value to a plurality of start values of the plurality of ranges.

Example 15 may include the subject matter of example 14, further comprising storing a second plurality of entries, each entry of the second plurality of entries associated with a portion of a second range of input values, each entry of the plurality of second entries comprising a set of coefficients defining a power series approximation.

Example 16 may include the subject matter of any of examples 11-15, wherein the selection of the first entry is further based on a determination that a request specifies a first unary function of a plurality of unary functions executable by the arithmetic engine.

Example 17 may include the subject matter of example 16, further comprising extracting a mantissa from a second floating point input responsive to a request specifying a second unary function of the plurality of unary functions; and evaluating a power series approximation on the extracted mantissa exclusive of an exponent and sign of the second floating point input, wherein the power series approximation is defined by coefficients retrieved based on the second floating point input.

Example 18 may include the subject matter of any of examples 11-17, further comprising determining that a second floating input value corresponds to a special case and outputting a value corresponding to the special case.

Example 19 may include the subject matter of any of examples 11-18, wherein the range is a first range of a plurality of ranges associated with a unary function, and further comprising determining that a second floating point input is within a second range of the plurality of ranges; determining that the second range is specified to operate in a constant mode; and outputting a constant associated with the second range as a second output value.

Example 20 may include the subject matter of any of examples 11-19, wherein the range is a first range of a plurality of ranges associated with a unary function, and further comprising determining that a second floating point input is within a second range of the plurality of ranges; determining that the second range is specified to operate in an identity mode; and outputting the second floating point input as a second output value.

Example 21 is a system comprising a first memory comprising a plurality of configuration registers to specify configuration of a plurality of unary functions; a second memory to store a plurality of entries associated with a first unary function of the plurality of unary functions, each entry of the plurality of entries associated with a portion of a range of input values, each entry of the plurality of entries comprising a set of coefficients defining a power series approximation; and an arithmetic engine to select a first entry of the plurality of entries based on a determination that a floating point input value is within a portion of the range of input values that is associated with the first entry; and calculate an output value by evaluating the power series approximation defined by the set of coefficients of the first entry at the floating point input value.

Example 22 may include the subject matter of example 21, wherein the second memory is to store a second plurality of entries associated with a second unary function of the plurality of unary functions, each entry of the second plurality of entries associated with a portion of a second range of input values, each entry of the second plurality of entries comprising a set of coefficients defining a power series approximation.

Example 23 may include the subject matter of any of examples 21-22, further comprising a matrix processing unit comprising the arithmetic engine.

Example 24 may include the subject matter of any of examples 21-23, wherein the arithmetic engine comprises a plurality of fused multiply-adders to evaluate the power series approximation.

Example 25 may include the subject matter of any of examples 21-24, further comprising a battery communicatively coupled to a processor comprising the arithmetic engine, a display communicatively coupled to the processor, or a network interface communicatively coupled to the processor.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a memory comprising:
  a lookup table to store a plurality of entries of a plurality of ranges, an entry of the plurality of entries associated with a portion of a particular range of input values and comprising a set of coefficients defining a power series approximation; and
  a control register set comprising a plurality of start values corresponding to the plurality of ranges; and
an arithmetic engine comprising circuitry to:
  determining a range corresponding to a floating point input value by comparing the floating point input value to at least two of the plurality of start values corresponding to the plurality of ranges;
  select a first entry of the plurality of entries based on a portion of the determined range that corresponds to the floating point input value;
  calculate an output value by evaluating the power series approximation defined by the set of coefficients of the first entry at the floating point input value; and
  determine that a second floating input value corresponds to a special case and output a value corresponding to the special case.

2. The processor of claim 1, the arithmetic engine to:
select a second entry of the plurality of entries based on a determination that a second floating point input value is within a portion of the range of input values that is associated with the second entry; and
calculate a second output value by evaluating the power series approximation defined by the set of coefficients of the second entry at the second floating point input value.

3. The processor of claim 1, wherein the evaluated power series approximation is $a_0+a_1x+a_2x^2$, wherein x is the floating point input value and $a_0$, $a_1$, and $a_2$ are the set of coefficients of the first entry.

4. The processor of claim 1, wherein the range is a first range of a plurality of ranges and wherein the arithmetic engine is to determine that the floating point input value is within the first range by comparing the floating point input value to a plurality of start values of the plurality of ranges.

5. The processor of claim 4, wherein the memory is to store a second plurality of entries, each entry of the second plurality of entries associated with a portion of a second range of input values, each entry of the plurality of second entries comprising a set of coefficients defining a power series approximation.

6. The processor of claim 1, wherein the selection of the first entry is further based on a determination that a request specifies a first unary function of a plurality of unary functions executable by the arithmetic engine.

7. The processor of claim 6, wherein the arithmetic engine is to:
extract a mantissa from a second floating point input responsive to a request specifying a second unary function of the plurality of unary functions; and
evaluate a power series approximation on the extracted mantissa exclusive of an exponent and sign of the second floating point input, wherein the power series approximation is defined by coefficients retrieved from the memory based on the second floating point input.

8. The processor of claim 1, wherein the range is a first range of a plurality of ranges associated with a unary function, and the arithmetic engine is to:
determine that a second floating point input is within a second range of the plurality of ranges;
determine that the second range is specified to operate in a constant mode; and
output a constant associated with the second range as a second output value.

9. The processor of claim 1, wherein the range is a first range of a plurality of ranges associated with a unary function, and the arithmetic engine is to:
determine that a second floating point input is within a second range of the plurality of ranges;
determine that the second range is specified to operate in an identity mode; and
output the second floating point input as a second output value.

10. A method comprising:
storing, in a lookup table, a plurality of entries of a plurality of ranges, an entry of the plurality of entries associated with a portion of a particular range of input values and comprising a set of coefficients defining a power series approximation;
determining, by an arithmetic engine comprising circuitry, a range corresponding to a floating point input value by comparing the floating point input value to at least two of a plurality of start values stored in a control register set, the plurality of start values corresponding to the plurality of ranges;
selecting, by the arithmetic engine, a first entry of the plurality of entries based on a portion of the determined range that corresponds to the floating point input value;
calculating, by the arithmetic engine, an output value by evaluating the power series approximation defined by the set of coefficients of the first entry at the floating point input value; and
determining, by the arithmetic engine, that a second floating input value corresponds to a special case and output a value corresponding to the special case.

11. The method of claim 10, further comprising:
selecting a second entry of the plurality of entries based on a determination that a second floating point input value is within a portion of the range of input values that is associated with the second entry; and
calculating a second output value by evaluating the power series approximation defined by the set of coefficients of the second entry at the second floating point input value.

12. The method of claim 10, wherein the evaluated power series approximation is $a_0+a_1x+a_2x^2$, wherein x is the floating point input value and $a_0$, $a_1$, and $a_2$ are the set of coefficients of the first entry.

13. The method of claim 10, further comprising storing a second plurality of entries, each entry of the second plurality of entries associated with a portion of a second range of input values, each entry of the plurality of second entries comprising a set of coefficients defining a power series approximation.

14. The method of claim 10, wherein the selection of the first entry is further based on a determination that a request specifies a first unary function of a plurality of unary functions executable by an arithmetic engine.

15. A system comprising:
a first memory comprising a plurality of configuration registers to specify configuration of a plurality of unary functions;
a second memory to store a plurality of entries associated with a first unary function of the plurality of unary functions, each entry of the plurality of entries associated with a portion of a range of input values, each entry of the plurality of entries comprising a set of coefficients defining a power series approximation; and
an arithmetic engine to:
  select a first entry of the plurality of entries based on a determination that a floating point input value is within a portion of the range of input values that is associated with the first entry; and
  calculate an output value by evaluating the power series approximation defined by the set of coefficients of the first entry at the floating point input value.

16. The system of claim 15, wherein the second memory is to store a second plurality of entries associated with a second unary function of the plurality of unary functions, each entry of the second plurality of entries associated with a portion of a second range of input values, each entry of the second plurality of entries comprising a set of coefficients defining a power series approximation.

17. The system of claim 15, further comprising a matrix processing unit comprising the arithmetic engine.

18. The system of claim 15, wherein the arithmetic engine comprises a plurality of fused multiply-adders to evaluate the power series approximation.

19. The system of claim 15, further comprising a battery communicatively coupled to a processor comprising the arithmetic engine, a display communicatively coupled to the processor, or a network interface communicatively coupled to the processor.

* * * * *